(12) United States Patent
Seo et al.

(10) Patent No.: US 9,369,797 B2
(45) Date of Patent: Jun. 14, 2016

(54) DISPLAY APPARATUS, DISPLAY SYSTEM, AND CONTROL METHOD THEREOF

(71) Applicant: Samsung Electronics Co., Ltd., Suwon-si (KR)

(72) Inventors: Je-hwan Seo, Suseong-gu (KR); Geun-sam Yang, Suwon-si (KR); Seung-bok Lee, Suwon-si (KR); Tae-hyeun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 13/956,424

(22) Filed: Aug. 1, 2013

(65) Prior Publication Data

US 2014/0037104 A1    Feb. 6, 2014

(30) Foreign Application Priority Data

Aug. 3, 2012 (KR) .................. 10-2012-0085242

(51) Int. Cl.
*H04B 3/00* (2006.01)
*H04R 3/00* (2006.01)
(Continued)

(52) U.S. Cl.
CPC ............. *H04R 3/00* (2013.01); *H04N 21/439* (2013.01); *H04N 21/4367* (2013.01); *H04N 21/43637* (2013.01); *H04N 21/44227* (2013.01); *H04R 2420/00* (2013.01); *H04W 4/008* (2013.01)

(58) Field of Classification Search
CPC ............ H04M 1/7253; H04M 1/6066; H04M 2250/02; H04W 12/06; H04W 12/08; H04W 92/18; G06F 21/445

USPC ........ 381/77, 312, 370; 455/41.2, 41.1, 426.1
See application file for complete search history.

(56) References Cited

U.S. PATENT DOCUMENTS

2006/0166718 A1    7/2006 Seshadri et al.
2007/0197164 A1    8/2007 Sheynman et al.
(Continued)

FOREIGN PATENT DOCUMENTS

EP    1596538 A1    11/2005
EP    2244468 A2    10/2010

OTHER PUBLICATIONS

Communication, dated Mar. 27, 2014, issued by the European Patent Office in counterpart European Patent Application No. 13177910.0.
(Continued)

*Primary Examiner* — Paul S Kim
*Assistant Examiner* — Norman Yu
(74) *Attorney, Agent, or Firm* — Sughrue Mion, PLLC (57) ABSTRACT

Exemplary embodiments disclose a display apparatus, a display system, and a control method thereof, the display apparatus including: an image processing device configured to process an image signal; an audio processing device configured to process an audio signal; a communication device configured to conduct wireless communication with a peripheral and configured to transmit the audio signal processed by the audio processing device to an audio output device; and a controller configured to operate in a discoverable mode for wireless communication access of the communication device, and configured to control the communication device to conduct pairing of the audio output device configured to transmit a preset message and the display apparatus for the wireless communication, when the preset message is received from the audio output device.

31 Claims, 7 Drawing Sheets

(51) Int. Cl.
*H04N 21/4363* (2011.01)
*H04N 21/4367* (2011.01)
*H04N 21/439* (2011.01)
*H04N 21/442* (2011.01)
*H04B 5/00* (2006.01)
*H04B 7/00* (2006.01)
*H04W 4/00* (2009.01)

(56) References Cited

U.S. PATENT DOCUMENTS

| | | | |
|---|---|---|---|
| 2008/0057890 A1 | 3/2008 | McKillop et al. | |
| 2009/0318081 A1* | 12/2009 | Winter | H04L 12/66 455/41.2 |
| 2012/0015605 A1 | 1/2012 | Sole | |
| 2012/0071134 A1 | 3/2012 | Jensen | |
| 2012/0238212 A1* | 9/2012 | Sangster | G06F 3/0231 455/41.2 |

OTHER PUBLICATIONS

"Bluetooth User Interface Flow Diagrams for Bluetooth Secure Simple Pairing Devices," Usability Expert Group, Sep. 13, 2007, pp. 1-54 https://www.bluetooth.org/Technical/Specifications/whitepapers.htm.

Communication, dated Oct. 25, 2013, issued by the European Patent Office in counterpart European Application No. 13177910.0.

Communication dated Apr. 24, 2015, issued by the European Patent Office in counterpart European Application No. 13177910.0.

Communication dated Feb. 16, 2016 issued by European Patent Office in counterpart European Patent Application No. 13177910.0.

* cited by examiner

DISPLAY APPARATUS, DISPLAY SYSTEM, AND CONTROL METHOD THEREOF

CROSS-REFERENCE TO RELATED APPLICATION

This application claims priority from Korean Patent Application No. 10-2012-0085242, filed on Aug. 3, 2012 in the Korean Intellectual Property Office, the disclosure of which is incorporated herein by reference.

BACKGROUND

1. Field

Apparatuses consistent with the exemplary embodiments relate to a display apparatus, a display system, and a control method thereof. More particularly, exemplary embodiments relate to a display apparatus conducting pairing of the display apparatus and an audio output device, a display system, and a control method thereof.

2. Description of the Related Art

With a growing demand for improving sound, such as a home theater, an audio output device providing a higher-quality sound to a user, such as an audio dock, may be connected to a display apparatus, such as a television (TV), for use as a single system, not as a separate external speaker.

Bluetooth, utilized a short-range radio technology, enables transmission of high-quality sounds, including stereo and mono sounds, and provides excellent compatibility between devices in a system, such as a TV, an audio dock, a mobile phone, a wireless headset, and a car audio system.

Thus, a related art wireless communication technology, including Bluetooth, may be used to connect the display apparatus and the audio output device.

To use wireless communication in the related art, a pairing process is necessary for communication as a link setup process.

A related art pairing process of a display apparatus involves various processes, e.g., that a user chooses a navigation mode and retrieves a peripheral supporting a relevant wireless communication through manipulation of a menu, selects a wanted device, e.g., an audio dock, from the retrieved list, requests pairing from the selected device, and then conducts a security procedure in each device.

Thus, a user having no background knowledge about pairing, or being unfamiliar with manipulation of the menu, may consider the related art pairing processes complicated.

Therefore, in the related art, the user may not properly pair the display apparatus and a device. Therefore, the user may not use the device. Accordingly, the user may not be satisfied since they may believe that a separate external speaker is not compatible with the display apparatus.

SUMMARY

One or more exemplary embodiments may provide a display apparatus including: an image processing device configured to process an image signal; an audio processing device configured to process an audio signal; a communication device configured to conduct wireless communication with a peripheral, and configured to transmit the audio signal processed by the audio processing device to an audio output device; and a controller configured to operate in a discoverable mode for wireless communication access of the communication device, and configured to control the communication device to conduct pairing of the audio output device configured to transmit a preset message and the display apparatus for the wireless communication, when the preset message is received from the audio output device.

The preset message may be an inquiry packet, which is received from the audio output device, when the audio output device is turned on, and the preset message is for retrieving a device supporting the wireless communication.

The display apparatus may further include a display device configured to display a user interface (UI) for selecting whether to connect with the audio output device.

The display apparatus may further include a user input device configured to receive a user selection on the UI, and the controller may be configured to conduct the pairing of the audio output device and the display apparatus based on the user selection.

The controller may be configured to control the display device to further display a UI indicating that the pairing of the audio output device and the display apparatus is completed.

The user input device may be configured to receive an input of a security code from a user for conducting the pairing, and the controller may be configured to conduct a security procedure of the audio output device and the display apparatus, based on the input security code.

The communication device may be configured to receive product information about the audio output device, and the controller may be configured to analyze the received product information and omit the security procedure, according to a result of the analysis.

The audio output device may be configured to operate as a master and the display apparatus may be configured to receive the preset message and may operate as a slave while the preset message is transmitted, and the controller may be configured to conduct a role switch, such that the display operates is configured to operate as the master and the audio output device is configured to operate as the slave, when the pairing is started.

The wireless communication may include Bluetooth communication supporting Advanced Audio Distribution Profile (A2DP).

One or more exemplary embodiments may provide a display system including a display apparatus and an audio output device, the display apparatus including: an image processing device configured to process an image signal; an audio processing device configured to process an audio signal; a first communication device configured to transmit the audio signal processed by the audio processing device to the audio output device; and a first controller configured to control the first communication device to conduct pairing of the display apparatus and the audio output device for wireless communication, and the audio output device including: a second communication device configured to receive the audio signal from the display apparatus; an internal audio output device configured to output the audio signal received from the display apparatus; a user input device configured to receive a preset user input; and a second controller configured to control the second communication device to transmit a preset message to the display apparatus, and configured to conduct pairing the audio output device and the display apparatus receiving the preset message for the wireless communication, when the preset user input is received through the user input device.

The transmitted preset message may include an inquiry packet to retrieve a device supporting the wireless communication.

The preset user input may include a power on command of the audio output device.

The second controller may be configured to control the second communication device to transmit product information about the audio output device to the display apparatus, when the pairing is started.

The wireless communication may include Bluetooth communication supporting Advanced Audio Distribution Profile (A2DP).

One or more exemplary embodiments may provide a control method of a display apparatus including: operating in a discoverable mode for connection of a communication device conducting wireless communication with a peripheral; receiving a preset message from an audio output device; conducting pairing the audio output device transmitting the preset message and the display apparatus for the wireless communication; and processing and transmitting an audio signal to the audio output device.

The preset message may be an inquiry packet, which is received from the audio output device, when the audio output device is turned on, and the preset message is for retrieving a device supporting the wireless communication.

The control method may further include displaying a user interface (UI) for selecting whether to connect with the audio output device.

The control method may further include receiving a user selection on the UI, and the conducing the pairing may comprise conducting the pairing of the audio output device and the display apparatus based on the user selection.

The control method may further include displaying a UI indicating that the pairing of the audio output device and the display apparatus is completed.

The control method may further include receiving input of a security code from a user for conducting the pairing, and the conducting the pairing may further include conducting a security procedure of the audio output device and the display apparatus, based on the input security code.

The control method may further include receiving product information about the audio output device, and the conducting the pairing may analyze the received product information, and omit the security procedure, according to a result of the analysis.

The audio output device may operate as a master, and the display apparatus may operate as a slave while receiving the preset message, and the method may further include conducting a role switch, such that the display apparatus operates as the master and the audio output device operates as the slave, when the pairing is started.

The wireless communication may include Bluetooth communication supporting Advanced Audio Distribution Profile (A2DP).

One or more exemplary embodiments may provide a control method of a display system including a display apparatus and an audio output device, the control method including: receiving a preset user input through a user input device of the audio output device; transmitting a preset message from the audio output device to the display apparatus; conducting pairing of the audio output device and the display apparatus configured to receive the preset message for wireless communication; receiving and outputting an audio signal in the audio output device, from the display apparatus.

The transmitted preset message may include an inquiry packet to retrieve a device supporting the wireless communication.

The receiving the preset user input may include receiving a power on command from the audio output device.

The conducting the pairing may include transmitting product information about the audio output device to the display apparatus, when the pairing is started.

The wireless communication may include Bluetooth communication supporting Advanced Audio Distribution Profile (A2DP).

One or more exemplary embodiments may provide a control method of a display apparatus including: operating in a discovery mode for conducting wireless communication between a communication device of the display apparatus and a peripheral; receiving a preset message from the peripheral; conducting pairing, between the peripheral transmitting the preset message and the display apparatus, for the wireless communication; and processing and transmitting a signal to the audio input device, wherein when the communication device receives product information, from the peripheral, which corresponds with product information from the display apparatus, the pairing is conducted without user input of a security code.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Hereinafter, exemplary embodiments will be described in detail with reference to accompanying drawings.

Figure 1:
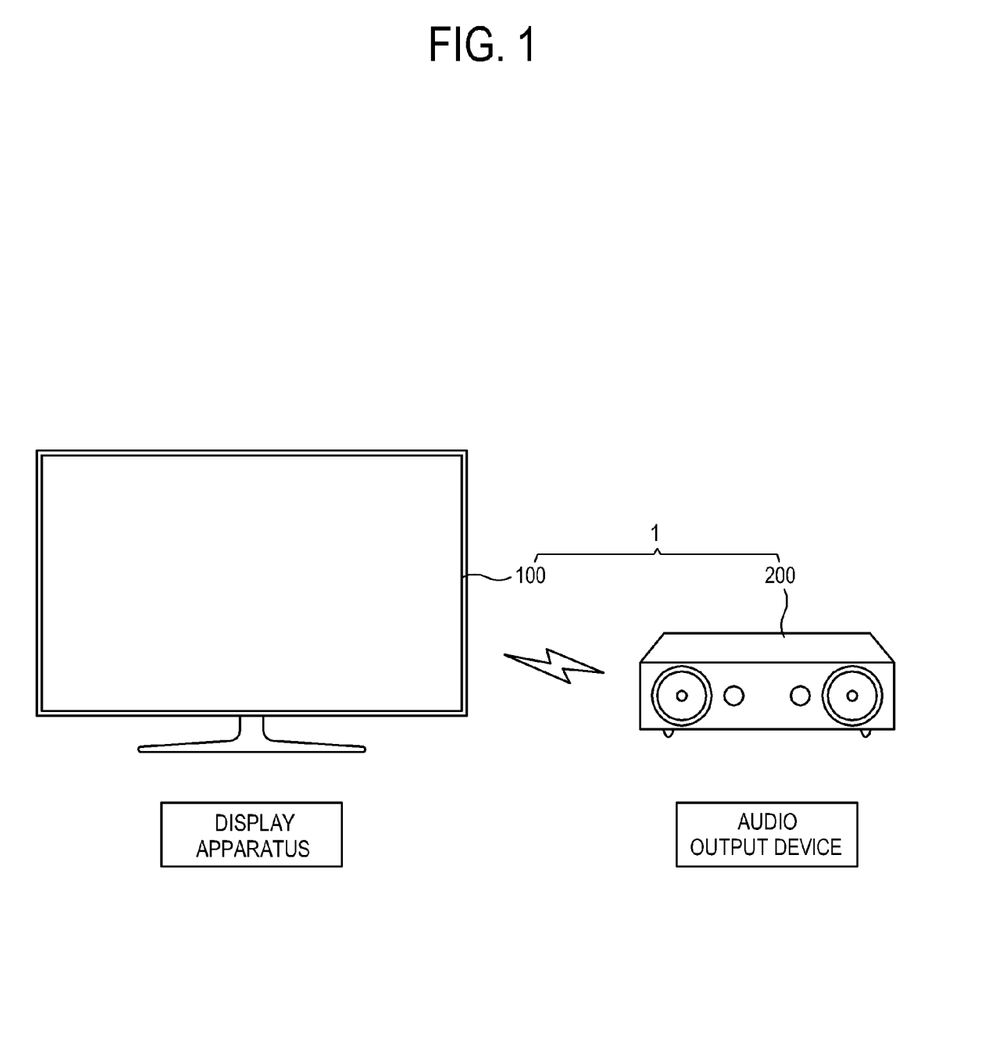
FIG. 1 illustrates a display system according to an exemplary embodiment.

FIG. 1 illustrates a display system 1 according to an exemplary embodiment.

As shown in FIG. 1, the display system 1 according to the present exemplary embodiment includes a display apparatus 100 and an audio output device 200. The display apparatus 100 and the audio output device 200 are connected to communicate with each other.

In the present embodiment, the display apparatus 100 and the audio output device 200 are described as being connected via a short-range radio technology, such as Bluetooth, without being limited thereto. Radio frequency (RF) communication techniques may be also adopted.

The display apparatus 100 processes an image signal provided from an external image source (not shown) according to a preset image processing process to be displayed as an image. The image processing process includes separating and processing an audio signal from an image signal. The display apparatus 100 transmits the processed audio signal to the audio output device 200 via wireless communication, and the audio output device 200 outputs the received audio signal.

The display apparatus 100 and the audio output device 200 are connected via wireless communication to transmit and receive an audio signal and a control signal. The display apparatus 100 and the audio output device 200 operate as a master and a slave.

In the system of the present embodiment, the display apparatus 100 is configured as a TV or a set top box, which displays broadcast images based on broadcast signals/broadcast information/broadcast data transmitted from a transmitter of a broadcasting station. However, the display apparatus 100 may be configured as various types of devices, which are capable of processing images, without being limited to a TV and a set top box.

Also, the display apparatus 100 may display any kind of image, without being limited to broadcast images. For example, the display apparatus 100 may display a variety of images, such as videos, still images, applications and on-screen display (OSD) based on signals/data received from different image sources (not shown), and graphic user interface (GUI) for controlling various operations.

According to the present embodiment, the display apparatus 100 may be provided as a smart TV. A smart TV is capable of receiving and displaying a broadcast signal in real time, has a web browsing function to retrieve and purchase various contents through the Internet while displaying a broadcast signal in real time, and provides a convenient user interface for the foregoing operations. Further, the smart TV includes an open software platform to provide a user with a bidirectional service. Thus, the smart TV provides a user with various contents, e.g., applications offering predetermined services, through the open software platform. Such applications include application programs capable of providing different kinds of services, e.g., SNS, finance, news, weather, map, music, movie, game, and electronic book.

In the present embodiment, the audio output device 200 is configured as an audio dock. The audio dock may provide a user with a high-quality sound.

The display system 1 according to the present embodiment connects the display apparatus 100 and the audio output device 200 via wireless communication, such as Bluetooth, so that a user may recognize the audio output device 200, not as a separate external speaker, but as the single display system 1 processing image and audio signals.

Meanwhile, the audio output device 200 of the display system 1 may be also applied to various electronic devices enabling wire communication, e.g., a mobile phone, a wireless headset, and a car audio system. These electronic devices are paired with the display apparatus 100 to receive and output an audio signal from the display apparatus 100 via wireless communication.

Figure 2:
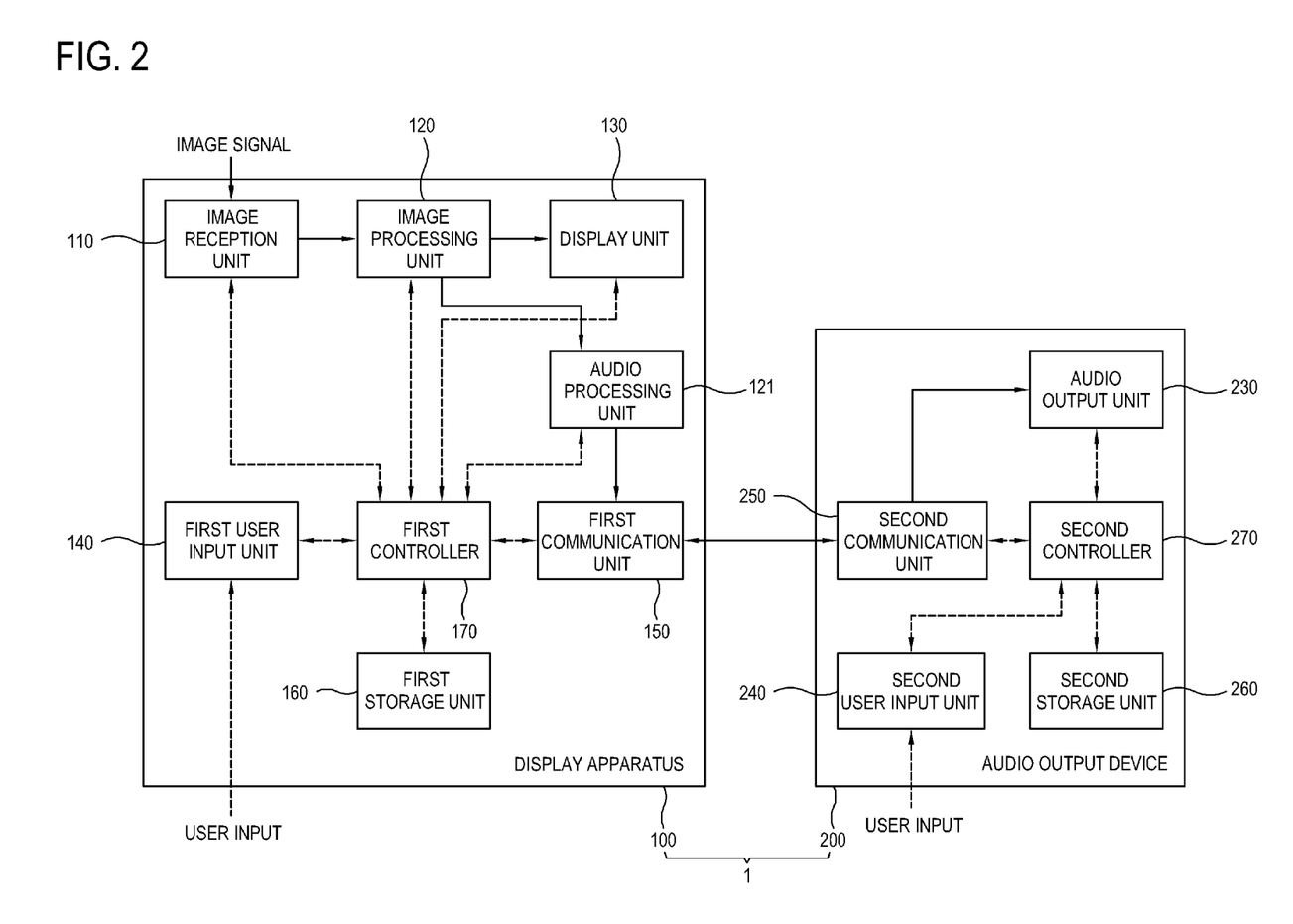
FIG. 2 is a block diagram illustrating a configuration of the display system of FIG. 1.

FIG. 2 is a block diagram illustrating a configuration of the display system 1 of FIG. 1.

As shown in FIG. 2, the display apparatus 100 processes an image signal provided from an external image source (not shown) according to a preset image processing process, thereby displaying an image.

In the present embodiment, the display apparatus 100 is configured as a TV, which displays broadcast images based on broadcast signals/broadcast information/broadcast data transmitted from a transmitter of a broadcasting station. However, the display apparatus 100 may be configured as various types of devices, which are capable of processing images, e.g., a set top box, a monitor, a laptop computer, and a desktop computer, without being limited to a TV.

Also, the display apparatus 100 may display any kind of image, without being limited to broadcast images. For example, the display apparatus 100 may display a variety of images, such as videos, still images, applications and OSD based on signals/data received from different image sources (not shown), and GUIs (also referred to as "UIs") for controlling various operations.

As shown in FIG. 2, the display apparatus 100 includes an image reception unit 110 receiving an image signal, an image processing unit 120 processing the image signal received by the image reception unit 110, an audio processing unit 121 processing an audio signal separated in the image processing unit 120, a display unit 130 displaying an image based on the image signal processed by the image processing unit 120, a first user input unit 140 receiving user input, a first communication unit 150 communicating with an external device, a first storage unit 160 storing various types of data, and a first controller 170 controlling the display apparatus 100.

The image reception unit 110 receives an image signal and transmits the signal to the image processing unit 120. The image reception unit 110 may be configured as various forms, corresponding to standards of received image signals and configurations of the display apparatus 100. For example, the image reception unit 110 may receive a radio frequency (RF) signal transmitted from a broadcasting station (not shown) wirelessly or image signals in accordance with composite video, component video, super video, SCART, or high definition multimedia interface (HDMI) standards via a cable. When an image signal is a broadcast signal, the image reception 110 includes a tuner to tune the broadcast signal by each channel.

Further, an image signal may be input from an external device, e.g., a personal computer (PC), an audio/video (A/V) device, a smartphone, and a smart pad. Also, an image signal may result from data received through a network, such as the Internet. In this case, the display apparatus 100 may perform network communication through the first communication unit 150, or further include a separate network communication unit. In addition, an image may come from data stored in the first storage unit 160, such as a flash memory and a hard disk. The first storage unit 160 may be provided inside or outside of the display apparatus 100. When the first storage unit 160 is provided outside the display apparatus 100, the display apparatus 100 may further include a connection unit (not shown) connected to the first storage unit 160.

The image processing unit 120 processes an image signal according to various kinds of preset image processing processes. The image processing unit 120 outputs the processed image signal to the display unit 130, so that an image based on the image signal is displayed on the display unit 130.

The image processing unit 120 separates a received image signal into a video signal, an audio signal, and various additional signals.

The image processing unit 120 may perform any type of image processing process, without being limited to, for example, decoding in accordance with various image formats, de-interlacing, frame refresh rate conversion, scaling, noise reduction to improve image quality, detail enhancement, and line scanning. The image processing unit 120 may be provided as a group of individual components capable of independently performing each process, or as an integrated multi-functional system on chip (SOC).

The audio processing unit 121 processes an audio signal separated in the image processing unit 120. The audio processing unit 121 may decode the audio signal into a signal to be output by the audio output device 200. The decoded audio signal is transmitted to the audio output device 200 through the first communication unit 150.

The display unit 130 displays an image based on an image signal processed by the image processing unit 120. The display unit 130 may be configured in various display modes using liquid crystals, plasma, light emitting diodes, organic light emitting diodes, a surface conduction electron emitter, a carbon nano-tube, nano-crystals, etc., without being limited thereto.

The display unit 130 may further include an additional element depending on a display mode thereof. For example, in a display mode using liquid crystals, the display unit 130 may include a liquid crystal display (LCD) panel, a backlight unit (not shown) providing light to the panel, and a panel drive board (not shown) driving the panel.

The display unit 130 may display a user interface (UI) for selecting whether to pair the display apparatus 100 and the audio output device 200, and a UI showing completion of pairing in a pairing process. A user may recognize a connectable audio output device 200, and prevent an unwanted device from being connected through the UI displayed on the display unit 130.

The user manipulates the first user input unit 140 to select whether to pair the display apparatus 100 and the audio output device 200. Here, the audio output device 200 to be paired transmits an inquiry packet.

The first user input unit 140 transmits various preset control commands or unlimited information to the first controller 170 by a user manipulation and input. The first user input unit 140 is provided as a menu key and an input panel installed on an outside of the display apparatus 100, or as a remote controller separate from the display apparatus 100. When the first user input unit 140 is configured as a remote controller, the first user input unit 140 may transmit a user input to the first controller 170 by any method, e.g., using wireless communication. Wireless communication includes at least one of infrared (IR) communication, RF communication, and Bluetooth. In this case, the display apparatus 100 may receive a signal corresponding to the user input through the first communication unit 150, and transmit the signal to the first controller 170.

Meanwhile, the first user input unit 140 may include a UI displayed on the display unit 130 for user selection. When the display unit 130 is a touch screen, the first user input unit 140 may transmit a command to the first controller 170, the command corresponding to user input received by the user touching the UI on the display unit 130.

The first communication unit 150 communicates with peripherals including the audio output device 200. When an inquiry packet as a preset message is received from the audio output device 200, the first communication unit 150 is paired with the audio output device 200 transmitting the message.

The first communication unit 150 may be configured as various kinds of wireless communication modules, including Bluetooth. When the first communication unit 150 is configured as a Bluetooth module, the Bluetooth module may support Advanced Audio Distribution Profile (A2DP). Further, the first communication unit 150 may transmit and receive data in accordance with a Logical Link Control and Adaption Protocol (L2CAP).

Pairing includes a process that the display apparatus 100 and the audio output device 200 transmit/receive identification information to/from each other, and store the identification information. When the first communication unit 150 is a Bluetooth module, the identification information about each of the apparatus 100 and the device 200 is a preset byte (e.g., 6 bytes) of Bluetooth address (hereinafter, also referred to as a Bluetooth device (BD) address) of each of the apparatus 100 and the device 200.

Meanwhile, in the present embodiment, the first communication unit 150 of the display apparatus 100 may be also configured as various wireless communication modules, for example, an RF communication module, without being limited to the Bluetooth module. When the first communication unit 150 is an RF module, the identification information may be a Media Access Control address (MAC address) of each of the apparatus 100 and the device 200.

The first storage unit 160 stores unlimited data according to control of the first controller 170. The first storage unit 160 is configured as a nonvolatile storage medium, such as a flash memory and a hard disk drive. The first storage unit 160 is accessed by the first controller 170, and the data stored in the first storage unit 160 may be read/recorded/revised/deleted/updated by the first controller 170.

The first storage unit 160 stores, e.g., an operating system to run the display apparatus 100 and various applications, image data, optional data, and audio data, separated from the image data, which are executable in the operating system. The separated audio data is transmitted to the audio output device 200 through the first communication unit 150. Further, the first storage unit 160 further stores the identification information, i.e., the BD address, about the display apparatus 100 for pairing of the first communication unit 150.

The first controller 170 performs control operations of various components of the display apparatus 100. For example, the first controller 170 conducts an image processing process of the image processing unit 120 and a control operation in response to a command from the remote controller, thereby controlling general operations of the display apparatus 100. The first controller 170 may be configured, for example, as a combination of a central processing unit (CPU) and software.

The first controller 170 of the present embodiment operates in a discoverable mode for wireless communication access of the first communication unit 150. When a preset message, i.e., an inquiry packet, is received from the audio output device 200, the first controller 170 controls the first communication unit 150 to pair the audio output device 200 transmitting the message and the display apparatus 100 for wireless communication.

Hereinafter, a configuration of the audio output device 200 will be described in detail.

As shown in FIG. 2, the audio output device 200 includes an audio output unit 230 outputting an audio signal, a second user unit 240 receiving user input, a second communication unit 250 communicating with an external device, a second storage unit 260 storing various kinds of data, and a second controller 270 controlling the audio output device 200.

The audio output unit 230 outputs an audio signal processed by the audio processing unit 121 of the display apparatus 100, and the audio signal is received from the display apparatus 100 through the second communication unit 250. Further, the audio output unit 230 may further output a sound related to completion, failure, or retry of pairing with the display apparatus 100, e.g., a buzzer sound, to a user.

In the present embodiment, the audio output unit 230 is provided as a speaker provided in the audio dock and providing a sound with improved quality.

The second user input unit 240 transmits various preset control commands or unlimited information to the second controller 270 by user manipulation and input. The second user input unit 240 may be provided as a button installed in an outside of the audio output device 200.

The second user input unit 240 of the present embodiment includes a power button to receive a power on command of the audio output device 200 from the user.

The second communication unit 250 communicates with peripherals including the display apparatus 100. In detail, when the power on command of the audio output device 200 is received by the user manipulating the second user input unit 240, the second communication unit 240 transmits a preset message, i.e., an inquiry packet, to the display apparatus 100.

The second communication unit 250 may be configured as various types of wireless communication modules including Bluetooth. When the second communication unit 250 is configured as a Bluetooth module, the Bluetooth module may support Advanced Audio Distribution Profile (A2DP). Further, the second communication unit 250 may transmit and receive data in accordance with a Logical Link Control and Adaptation Protocol (L2CAP).

The audio output device 200 is paired with the display apparatus 100 receiving the message. Pairing includes a process that the display apparatus 100 and the audio output device 200 transmit/receive identification information to/from each other, and store the identification information. When the second communication unit 250 is a Bluetooth module, the identification information about each of the apparatus 100 and the device 200 is a preset byte (e.g., 6 bytes) of Bluetooth address for each of the apparatus 100 and the device 200.

Meanwhile, in the present embodiment, the second communication unit 250 of the display apparatus 100 may also be configured as various types of wireless communication modules, e.g., an RF communication module, without being limited to the Bluetooth module. When the second communication unit 250 is an RF module, the identification information may be an MAC address of each of the apparatus 100 and the device 200.

The second storage unit 260 stores unlimited data according to control of the second controller 270. In the present embodiment, the second storage unit 260 stores the identification information, i.e., the BD address, about the audio output device 200 for pairing of the second communication unit 250.

The second storage unit 260 may be configured as a nonvolatile storage medium, such as a flash memory, and is accessed by the second controller 270.

The second controller 270 performs control operations of various components of the audio output device 200. For example, the second controller 270 generates a command corresponding to manipulation of the second user input unit 240 by the user, and controls the second communication unit 250 to transmit the generated command to the display apparatus 100.

The second controller 270 may be configured, for example, as a combination of a microcontroller unit (MCU) and software.

In the present embodiment, when a preset user input, i.e., a power on command, is received from the user, the second controller 270 controls the second communication unit 250 to transmit an inquiry packet as a preset message for conducting pairing. In the present embodiment, the inquiry packet is transmitted when the power on command is received. However, the inquiry packet may be transmitted according to another user command, e.g., when a volume control button provided in the audio output device 200 is manipulated by the user.

Figure 3:
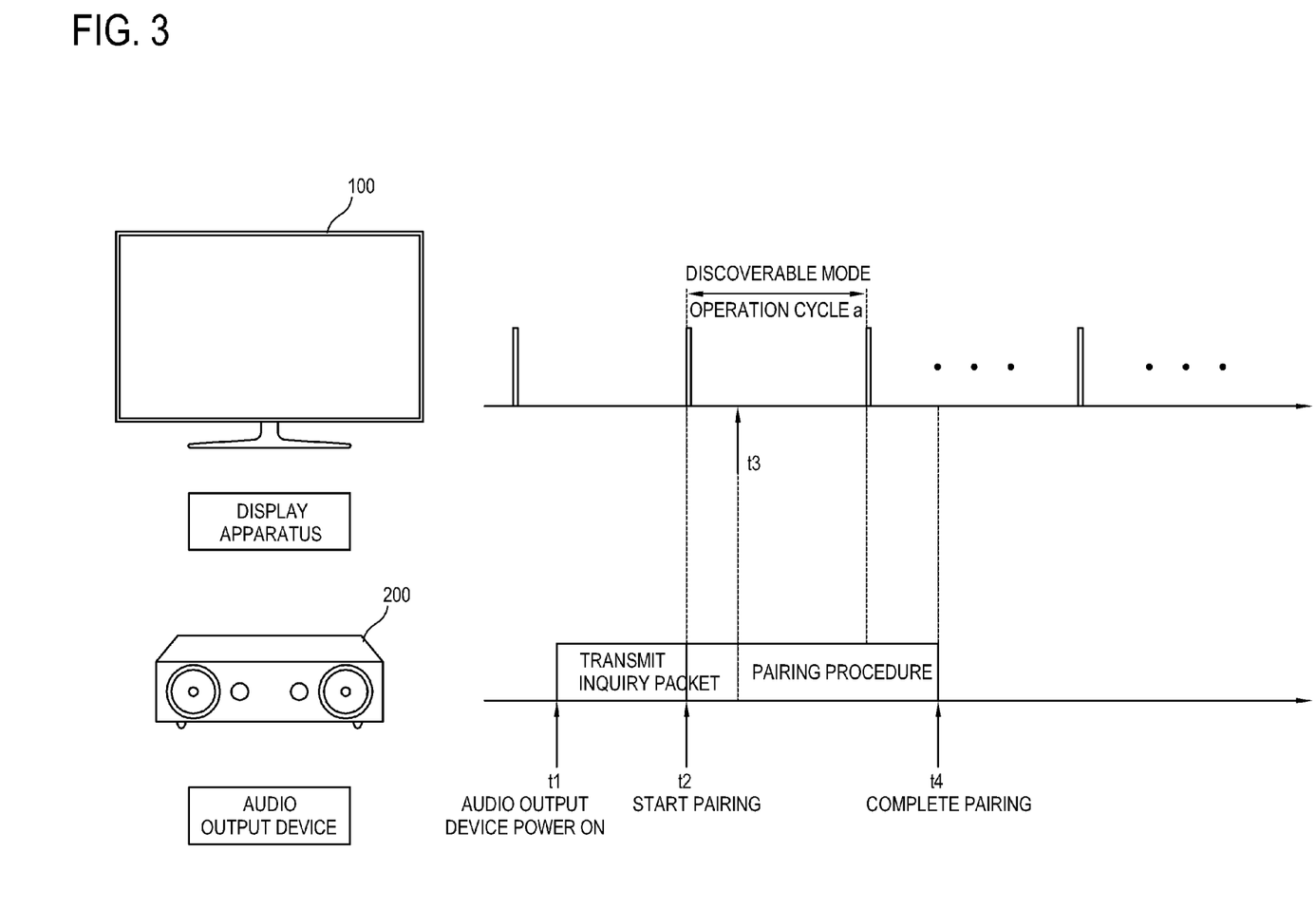
FIG. 3 illustrates a process of pairing of a display apparatus and an audio output device according to an exemplary embodiment.

FIG. 3 illustrates a process of pairing the display apparatus 100 and the audio output device 200, according to an exemplary embodiment.

Referring to FIG. 3, the first controller 170 controls the display apparatus 100 to operate in a discoverable mode on a preset cycle a. The discoverable mode is a mode in which the display apparatus 100 is able to receive an inquiry packet from peripherals, including the audio output device 200.

A user manipulates the second user input unit 240 at a time t1 to turn on the audio output device 200, while the display apparatus 100 operates in the discoverable mode on the cycle.

The second controller 270 of the audio output device 200 controls the second communication unit 250 to transmit an inquiry packet as a preset message for conducting pairing, in response to a power on command received from the user.

The second controller 270 may control the second communication unit 250 to transmit the inquiry packet as a broadcast signal. The inquiry packet may include the BD address of the audio output device 200 as identification information.

In the display system 1 according to the present embodiment, from the time t1 when the inquiry packet is transmitted to a time t3, the audio output device 200 operates as a master, and the display apparatus 100 receiving the inquiry packet operates as a slave.

The first controller 170 of the display apparatus 100 controls the first communication unit 150 to receive the inquiry packet from the audio output device 200 at a time t2, on the cycle a of the discoverable mode. Then, a pairing procedure of the display apparatus 100 and the audio output device 200 transmitting the inquiry packet is carried out. The pairing procedure of the present embodiment includes sequentially conducting baseband connection, Adaptive Frequency Hopping (AFH) setup, opening A2DP L2CAP control and interrupt channels, data transmission and reception, and closing A2DP L2CAP interrupt and control channels.

The first controller 170 starts pairing at the time t2 when the inquiry packet is received from the audio output device. When the received inquiry packet includes the BD address of the audio output device 200, the first controller 170 stores the BD address in the first storage unit 160. Then, the first controller 170 controls the first communication unit 150 to transmit the BD address of the display apparatus 100 to the audio output device 200.

The second controller 270 receives and stores the BD address of the display apparatus 100 in the second storage unit 260. When the inquiry packet does not include the BD address, the second controller 270 transmits the BD address of the audio output device 200 to the display apparatus 100.

The display apparatus 100 and the audio output device 200 may be paired by storing information, such as the BD addresses of the other devices, and using the stored information.

In the display system 1 of the present embodiment, when pairing is started, a role switch of a master and a slave may be carried out. For example, at the time T3 when the AFH setup is completed, a role switch may be achieved, so that the display apparatus 100 operates as a master, and the audio output device 200 receiving the BD address of the display apparatus 100 operates as a slave.

Accordingly, in the display system 1 of the present embodiment, when the power on command is received, the audio output device 200 transmits the preset message, i.e., the inquiry packet, and then the audio output device 200 transmitting the message and the display apparatus 100 are automatically paired. Thus, the display apparatus 100 automatically conducts pairing, without a process of searching a device through manual manipulation of a menu and selecting a device from a list. Thus, user convenience is improved.

Meanwhile, the first controller 170 may control the display unit 130 to display a UI 40, e.g., a pop-up window, for selecting whether to connect with the audio output device 200 transmitting the inquiry packet, i.e., to conduct pairing with the audio output device 200.

Figure 4:
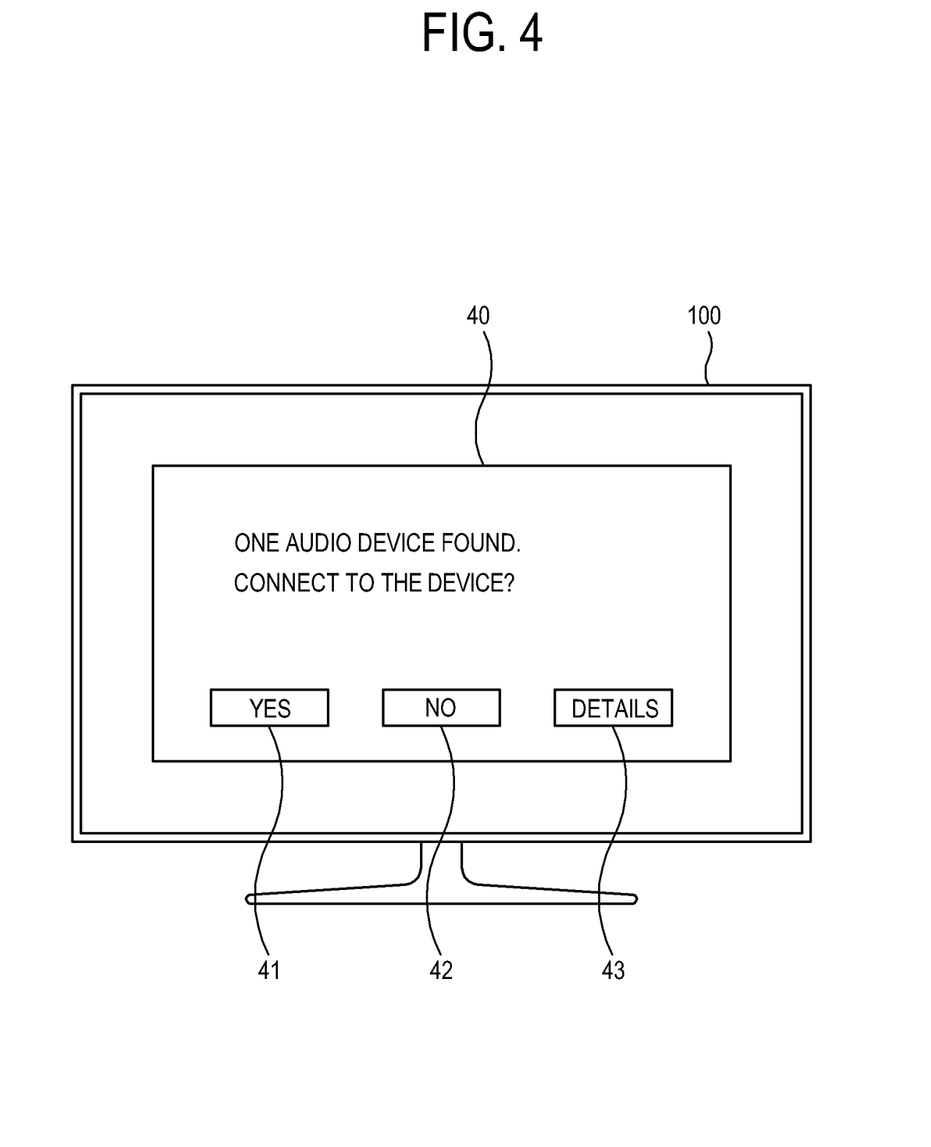
FIGS. 4 and 5 illustrate user interfaces (UIs) according to exemplary embodiments.
Figure 5:
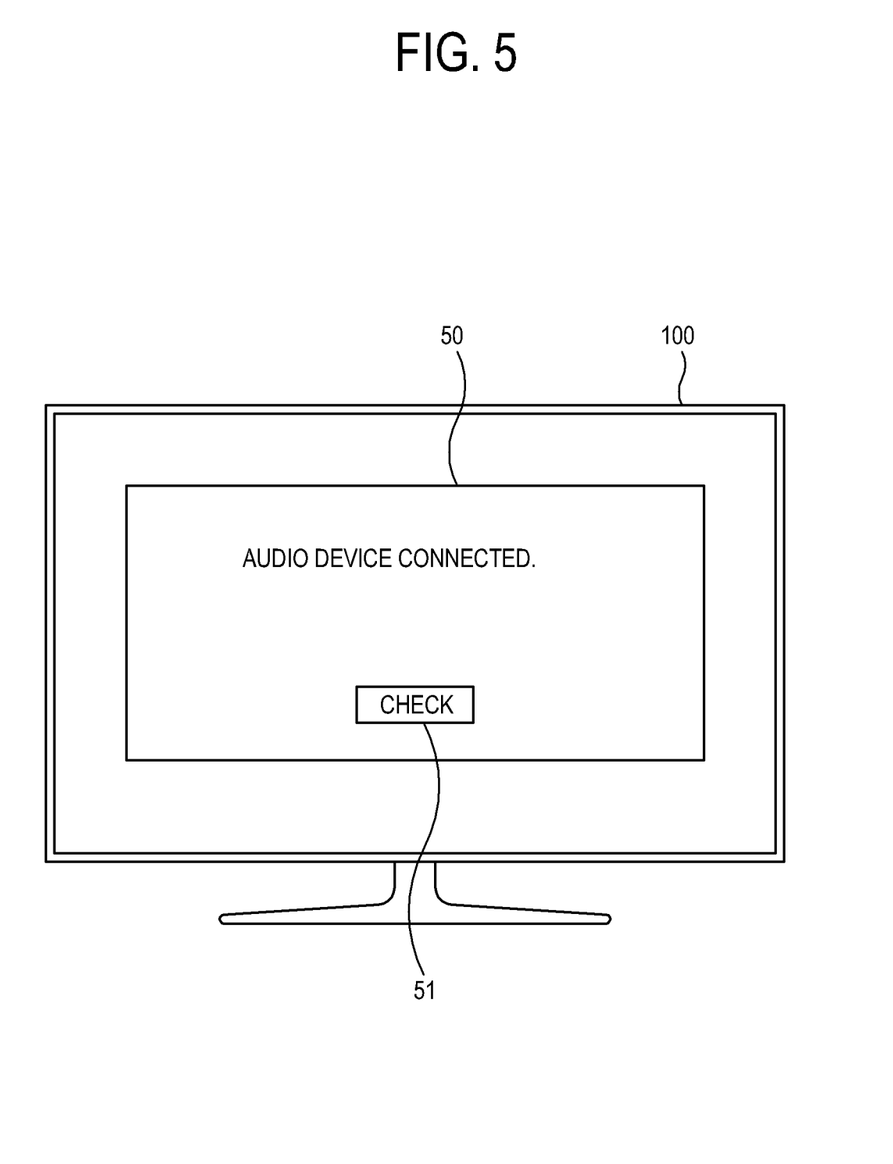

FIGS. 4 and 5 illustrate UIs according to exemplary embodiments.

As shown in FIG. 4, the display unit 130 displays a UI 40 for selecting whether to connect with the audio output device 200 retrieved, and the UI 40 includes selection items 41, 42, and 43. The user may input a user selection with respect to the displayed UI 40 by manipulating the first user input unit 140.

In the present embodiment, the user is notified whether to conduct pairing and enabled to make a selection regarding pairing, thereby preventing wrong devices to be paired, e.g., a TV of a neighbor and the audio output device 200. Further, an intuitive UI is provided to enhance usability.

The user may select whether to conduct pairing by selecting a selection item 41 or 42. Also, the user may select a selection item 43 to identify details of the audio output device 200, and check whether it is a device to be paired. The details may include an apparatus name, manufacturer information, and a BD address.

The first controller 170 controls the first communication unit 150 to transmit the BD address of the display apparatus 100 to the audio output device 200, in response to a user selection on the UI 40 of FIG. 4.

The second controller 270 of the audio output device 200 stores the BD address of the display apparatus in the second storage unit 260, and notifies the display apparatus 100 that the BD address is stored in the second storage unit 260.

Then, the first controller 170 may conduct a security procedure. The security procedure of the present embodiment is carried out by a security service provider (SSP), which may include a process that the user inputs a security code, e.g., a personal identification number or a pin code, into at least one of the master (the display apparatus 100) and the slave (the audio output device 200), and confirming the input security code.

In the present embodiment, the display apparatus 100 may further receive product information, e.g., information about a class of device (CoD), from the audio output device 200. The CoD includes a preset value corresponding to a manufacturer of a product. The first controller 170 analyzes the received product information about the audio output device 200. When manufacturer information included in the product information is consistent with manufacturer information about the display apparatus 100, the first controller 170 determines that the product information about the audio output device 200 corresponds to product information about the display apparatus 100, authenticates the audio output device 200, and may omit the SSP security procedure usually input by a user.

When the security procedure is carried out using the product information, and a process of inputting a security code is omitted, the user may not need to input the security code. In other words, an inconvenient step of a user inputting a security code may be omitted.

When the SSP security procedure or the security procedure using the product information is carried out, pairing the display apparatus 100 and the audio output device 200 is completed.

When the pairing is completed, as shown in FIG. 5, the first controller 170 controls the display unit 130 to display a UI 50 indicating that the display apparatus 100 and the audio output device 200 are completely paired. The user confirms that the pairing is normally carried out through the UI 50 of FIG. 5, and may select a selection item 51.

Meanwhile, the first controller 170 controls the first communication unit 150 to transmit a sound indicating that the pairing is completed to the audio output device 200, and the second controller 270 receives the sound through the second communication unit 250, and controls the audio output unit 230 to output the sound.

The UI 50 displayed on the display unit 130 or the sound output from the audio output unit 230 enables the user to recognize that the display apparatus 100 and the audio output device 200 are normally paired.

According to this process, the display apparatus 100 and the audio output device 200 are completely paired at a time t4 of FIG. 3. When the pairing is completed, the display apparatus 100 and the audio output device 200 are automatically connected, and an audio signal processed in the display apparatus 100 is transmitted to the audio output device 200. The audio output device 200 outputs the audio signal received from the display apparatus 100. Accordingly, the user may listen to a sound with improved quality.

Meanwhile, when the pairing fails, the display unit 130 may report the occurrence of an error, and further display a UI for selecting whether to retry pairing. Further, the audio output unit 230 may output a sound related to the failure of pairing, or retrying of the pairing. The first controller 170 and the second controller 270 automatically retry pairing when pairing fails, thereby improving user convenience.

Hereinafter, a control method of the display system according to the present embodiment will be described with reference to FIG. 6.

Figure 6:
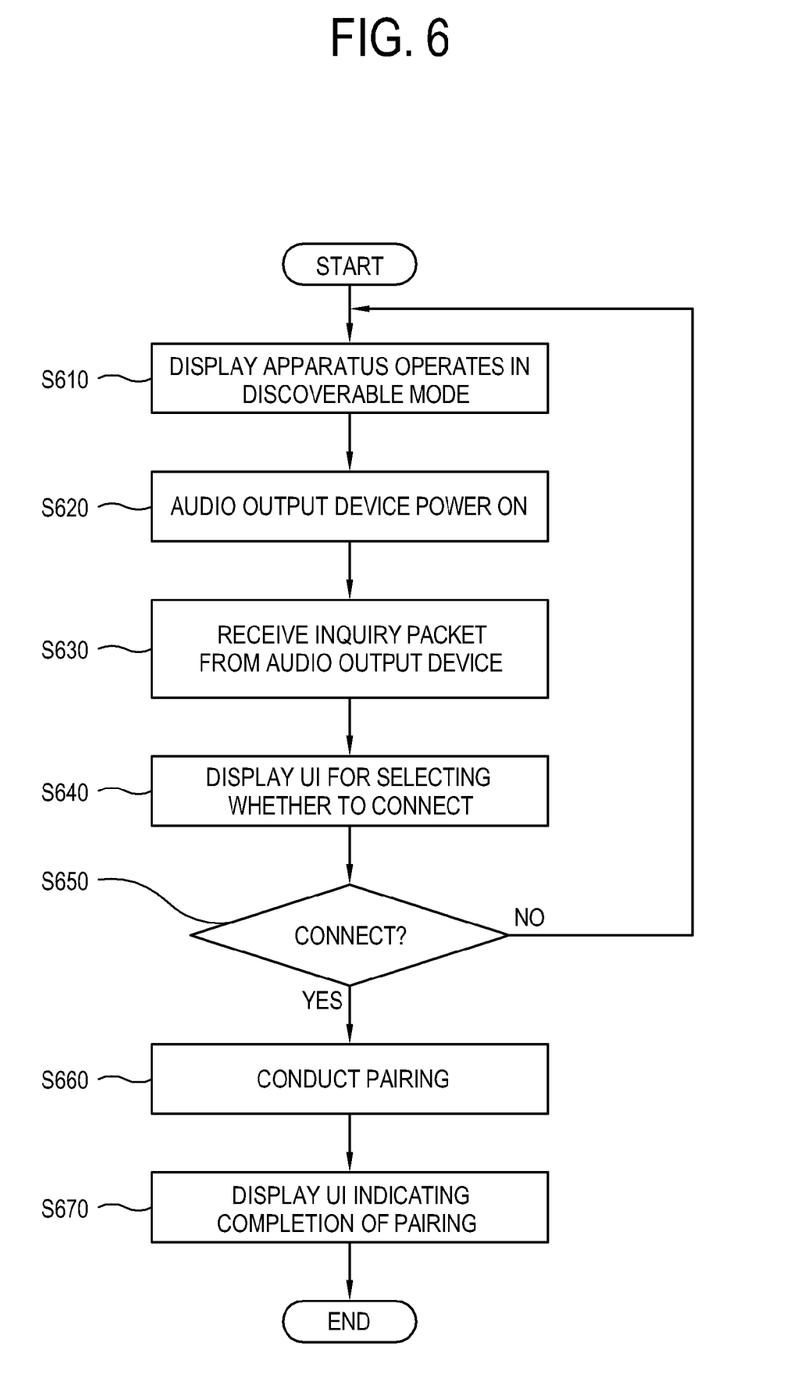
FIG. 6 is a flowchart illustrating a control method of the display system according to the exemplary embodiment.

FIG. 6 is a flowchart illustrating the control method of the display system 1.

As shown in FIG. 6, the display apparatus 100 operates in a discoverable mode for wireless communication access of the first communication unit 150 on a preset cycle a (S610).

When a power on command is input from the user, the audio output device 200 transmits a preset message for retrieving a device supporting wireless communication of the second communication unit 250, i.e., an inquiry packet, and the display apparatus 100 receives the inquiry packet from the audio output device 200 (S620). In the display system 1, the audio output device 200 transmitting the inquiry packet operates as a master, and the display apparatus 100 receiving the inquiry packet operates as a slave.

The first controller 170 of the display apparatus 100 displays the UI 40 for selecting whether to connect (pair) with the audio output device 200 transmitting the inquiry packet on the display unit 130 (S640).

The user selects one of the selection items 41 and 42 of the displayed UI 40 by manipulating the first user input unit 140, thereby selecting whether to connect with the audio output device 200 (S650).

When connecting the apparatus 100 and the device 200 is selected in operation S650, the display apparatus 100 and the audio output device 200 are paired with each other (S660). The display apparatus 100 and the audio output device 200 transmit/receive and store identification information, e.g., BD addresses, about each other and conduct pairing to communicate with each other based on the identification information stored in each of the apparatus 100 and the device 200.

When pairing is completed in operation S660, the display apparatus 100 displays the UI 50 indicating completion of pairing on the display unit 130 (S670).

Figure 7:
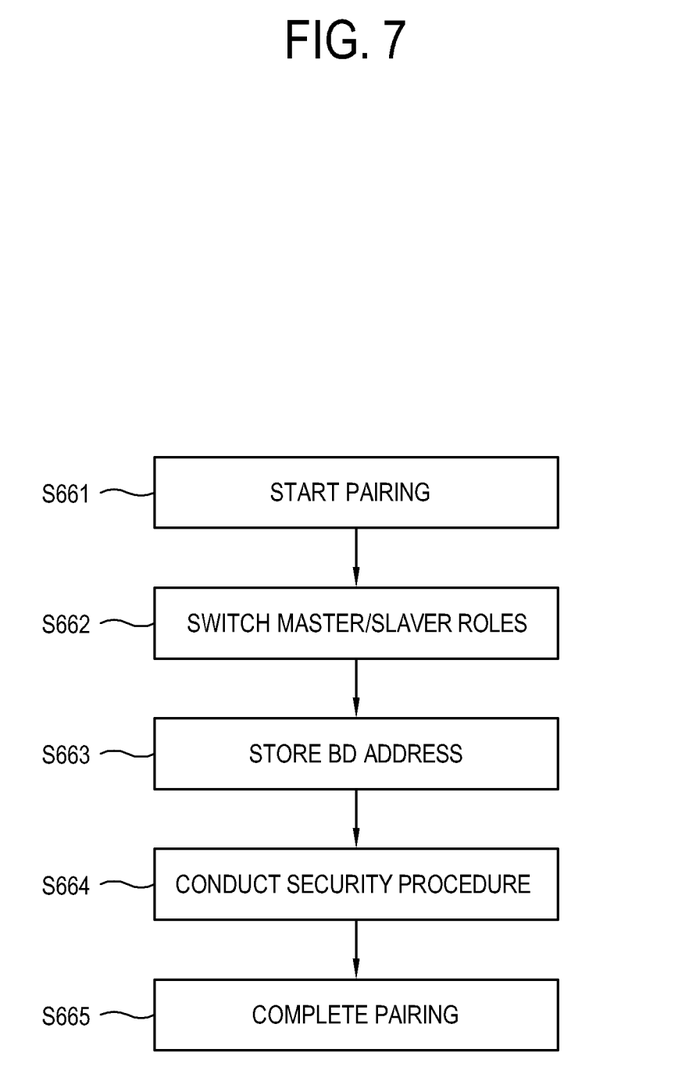
FIG. 7 is a flowchart illustrating the pairing process in operation S660 of FIG. 6.

FIG. 7 is a flowchart illustrating the pairing process in operation S660 of FIG. 6.

When the apparatus 100 and the device 200 are selected to be connected in operation S650, pairing of the display apparatus 100 and the audio output device 200 is started (S661).

When pairing is started in operation S661, the display system 1 switches master/slave roles, in an opposite way to operation S620. Accordingly, the display apparatus 100 operates as a master, and the audio output device 200 operates as a slave.

When pairing is started in operation S661, the display apparatus 100 and the audio output device 200 transmit their own identification information, e.g., BD addresses, to the other devices and store the identification information about the other devices (S663). The display apparatus 100 may store previously received identification information about the audio output device 200, included in the inquiry packet received in operation S620.

Then, at least one of the display apparatus 100 and the audio output device 200 conducts a security procedure (S664). The security procedure may include any one of security by an SSP, in which the user inputs a pin code as a security code into the display apparatus 100, the input security code is confirmed, and authentication by the display apparatus 100 is performed based on whether the display apparatus 100 manufacturer information included in CoD information received from the audio output device 200 corresponds to manufacturer information about the display apparatus 100.

When operations S661 to S664 are completed, the display apparatus 100 and the audio output device 200 are completely paired (S665).

Accordingly, an audio signal processed in the display apparatus 100 is transmitted to the audio output device 200 through the first communication unit 150, the second communication unit 250 is automatically paired, and the audio output device 200 outputs the received audio signal through the audio output unit 230. Thus, the user is provided with a sound with improved quality.

According to the present embodiment, when a power on command is received, the audio output device 200 transmits an inquiry packet, and the audio output device 200 transmitting the message and the display apparatus 100 are automatically paired. Therefore, there is no necessity to include processes of searching a device through manual manipulation of a menu and selecting a device from a list. Thus, in the present embodiment, a user convenience is improved, especially when the user has no background knowledge about pairing or is unfamiliar with manipulation of the menu.

Further, a user is notified whether to conduct pairing and enabled to make a selection regarding pairing, thereby preventing wrong devices to be paired. Further, an intuitive UI is provided to enhance usability.

In addition, due to a simple security procedure via authentication using product information, in which a security process that a user personally inputs a security code is omitted, the user may not need to inconveniently input the security code.

In an alternative embodiment, any of the image reception unit 110, the image processing unit 120, the audio processing unit 121, the display unit 130, the first user input unit 140, the first communication unit 150, the audio output unit 230, the second user input unit 240, and the second communication unit 250 in FIG. 2 may include at least one of a processor, a hardware module, and a circuit for performing their respective functions.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. A display apparatus comprising:
a display device;
an image processing device configured to process an image signal;
an audio processing device configured to process an audio signal;
a communication device configured to conduct wireless communication with a peripheral, and configured to transmit the audio signal processed by the audio processing device to an audio output device;
a user input device configured to receive a user input; and
a controller configured to operate in a discoverable mode based on a preset cycle for wireless communication access of the communication device, and configured to control the communication device to conduct pairing of the audio output device configured to transmit a preset message and the display apparatus for the wireless communication in response to the preset message being received from the audio output device while the discoverable mode is scanning according to the preset cycle,
wherein the controller is further configured to display a user interface (UI) on the display unit in response to the preset message being received from the audio output device in the discoverable mode,
wherein the UI comprises a selection item to display detailed information of the audio output device, and
wherein the controller is further configured to conduct the paring according to the received user input using the selection item of the UI.

2. The display apparatus of claim 1, wherein the preset message is an inquiry packet, which is received from the audio output device, when the audio output device is turned on, and the preset message is for retrieving a device supporting the wireless communication.

3. The display apparatus of claim 1, wherein the controller is configured to display a user interface (UI) for selecting whether to connect with the audio output device.

4. The display apparatus of claim 3, wherein the controller is configured to conduct the pairing of the audio output device and the display apparatus based on the user selection.

5. The display apparatus of claim 4, wherein the controller is configured to control the display device unit to further display a first UI indicating that the pairing of the audio output device and the display apparatus is failed and a second UI inquiring about a retry of the pairing.

6. The display apparatus of claim 4, wherein the user input device is configured to receive an input of a security code from a user for conducting the pairing, and the controller is configured to conduct a security procedure of the audio output device and the display apparatus, based on the input security code.

7. The display apparatus of claim 6, wherein the communication device is configured to receive product information about the audio output device, and the controller is configured to analyze the received product information and omit the security procedure, according to a result of the analysis.

8. The display apparatus of claim 1, wherein the audio output device is configured to operate as a master, and the display apparatus is configured to receive the preset message and operate as a slave while the preset message is transmitted, and the controller is configured to conduct a role switch, such that the display apparatus is configured to operate as the master and the audio output device is configured to operate as the slave, when the pairing is started.

9. A display system comprising a display apparatus and an audio output device,
the display apparatus comprising:
a display device;
an image processing device configured to process an image signal;

an audio processing device configured to process an audio signal;

a first communication device configured to transmit the audio signal processed by the audio processing device to the audio output device;

a user input device configured to receive a user input; and a first controller configured to operate in a discoverable mode based on a preset cycle, and control the first communication device to conduct pairing of the display apparatus and the audio output device for wireless communication, and the audio output device comprising:

a second communication device configured to receive the audio signal from the display apparatus;

an internal audio output device configured to output the audio signal received from the display apparatus;

a user input device configured to receive a preset user input; and a second controller configured to control the second communication device to transmit a preset message to the display apparatus, and configured to conduct pairing the audio output device and the display apparatus receiving the preset message for the wireless communication in response to the preset user input being received through the user input device while the discoverable mode is scanning according to the preset cycle, wherein the first controller is further configured to display a user interface (UI) on the display in response to the preset message being received from the audio output device in the discoverable mode, wherein the UI comprises a selection item to display detailed information of the audio wherein the first controller is further configured to conduct the arm according to the received user input using the selection item of the UI.

10. The display system of claim 9, wherein the transmitted preset message comprises an inquiry packet to retrieve a device supporting the wireless communication.

11. The display system of claim 9, wherein the preset user input comprises a power on command of the audio output device.

12. The display system of claim 9, wherein the second controller is configured to control the second communication device to transmit product information about the audio output device to the display apparatus, when the pairing is started.

13. The display system of claim 9, wherein the wireless communication comprises Bluetooth communication supporting Advanced Audio Distribution Profile (A2DP).

14. A control method of a display apparatus comprising:

operating in a discoverable mode based on a preset cycle for connection of a communication device conducting wireless communication with a peripheral;

receiving a preset message from an audio output device;

conducting pairing the audio output device transmitting the preset message and the display apparatus for the wireless communication in response to the preset message being received from the audio output device while the discoverable mode is scanning on according to the preset cycle; and processing and transmitting an audio signal to the audio output device, wherein the conducting pairing comprising displaying a user interface (UI) on the display in response to the preset message being received from the audio output device in the discoverable mode, wherein the UI comprises a selection item to display detailed information of the audio output device, and wherein the conducting pairing comprising conducting the paring according to the received user input using the selection item of the UI.

15. The control method of claim 14, wherein the preset message is an inquiry packet, which is received from the audio output device, when the audio output device is turned on, and the preset message is for retrieving a device supporting the wireless communication.

16. The control method of claim 14, further comprising displaying a user interface (UI) for selecting whether to connect with the audio output device.

17. The control method of claim 16, further comprising receiving a user selection on the UI, wherein the conducting the pairing comprises conducting the pairing of the audio output device and the display apparatus based on the user selection.

18. The control method of claim 17, further comprising displaying a UI indicating that the pairing of the audio output device and the display apparatus is completed.

19. The control method of claim 18, further comprising receiving input of a security code from a user for conducting the pairing, wherein the conducting the pairing further comprises conducting a security procedure of the audio output device and the display apparatus, based on the input security code.

20. The control method of claim 19, further comprising receiving product information about the audio output device, wherein the conducting the pairing analyzes the received product information, and omits the security procedure, according to a result of the analysis.

21. The control method of claim 14, wherein the audio output device operates as a master, and the display apparatus operates as a slave while receiving the preset message, and the method further comprises conducting a role switch, such that the display apparatus operates as the master and the audio output device operates as the slave, when the pairing is started.

22. The control method of claim 14, wherein the wireless communication comprises Bluetooth communication supporting Advanced Audio Distribution Profile (A2DP).

23. A control method of a display system comprising a display apparatus and an audio output device, the control method comprising:

operating a discoverable mode based on a preset cycle;

receiving a preset user input through a user input device of the audio output device;

transmitting a preset message from the audio output device to the display apparatus;

conducting pairing of the audio output device and the display apparatus configured to receive the preset message for wireless communication in response to the preset message being received while the discoverable mode is scanning on according to the preset cycle; and receiving and outputting an audio signal in the audio output device, from the display apparatus, wherein the conducting pairing comprising displaying a user interface (UI) on the display in response to the preset message being received from the audio output device in the discoverable mode, wherein the UI comprises a selection item to display detailed information of the audio output device, and wherein the conducting pairing comprising conducting the paring according to the received user input using the selection item of the UI.

24. The control method of claim 23, wherein the transmitted preset message comprises an inquiry packet to retrieve a device supporting the wireless communication.

25. The control method of claim 23, wherein the receiving the preset user input comprises receiving a power on command from the audio output device.

26. The control method of claim 23, wherein the conducting the pairing comprises transmitting product information about the audio output device to the display apparatus, when the pairing is started.

27. The control method of claim 23, wherein the wireless communication comprises Bluetooth communication supporting Advanced Audio Distribution Profile (A2DP).

28. A control method of a display apparatus comprising:
operating in a discovery mode based on a preset cycle for conducting wireless communication between a communication device of the display apparatus and a peripheral;
receiving a preset message from the peripheral;
conducting pairing, between the peripheral transmitting the preset message and the display apparatus, for the wireless communication in response to the preset message being received while the discoverable mode scanning according to the preset cycle; and
processing and transmitting a signal to the peripheral,
wherein when the communication device receives product information, from the peripheral, which corresponds with product information from the display apparatus, the pairing is conducted without user input of a security code,
wherein the conducting pairing comprising displaying a user interface (UI) on the display in response to the preset message being received from the audio output device in the discoverable mode,
wherein the UI comprises a selection item to display detailed information of the audio output device, and
wherein the conducting pairing comprising conducting the paring according to the received user input using the selection item of the UI.

29. The control method of claim 28, wherein the product information from the peripheral is a same product information as the product information from the display apparatus.

30. The control method of claim 28, wherein the peripheral is an audio output device which communicates with the display apparatus through the wireless communication comprising Bluetooth communication supporting Advanced Audio Distribution Profile (A2DP).

31. The control method of claim 28, wherein the received preset message comprises an inquiry packet to retrieve the peripheral supporting the wireless communication.

* * * * *